United States Patent [19]

Reime

[11] Patent Number: 5,378,946
[45] Date of Patent: Jan. 3, 1995

[54] ARRANGEMENT FOR TEMPORAL DETECTION OF A SIGNAL EDGE OF AN ELECTRICAL SIGNAL TRANSMITTED OVER A TRANSMISSION LINE

[75] Inventor: Gerd Reime, Schömberg, Germany

[73] Assignee: Nokia Technology GmbH, Pforzheim, Germany

[21] Appl. No.: 55,838

[22] Filed: Apr. 30, 1993

[30] Foreign Application Priority Data

May 6, 1992 [DE] Germany .................. 4214949

[51] Int. Cl.[6] .................. H03K 5/153; H03K 5/22
[52] U.S. Cl. .................. 327/14; 327/78; 327/263; 327/361
[58] Field of Search .................. 307/351, 354, 236, 601, 307/602, 529, 517

[56] References Cited

U.S. PATENT DOCUMENTS

| Re. 34,176 | 2/1993 | Skinner | 358/166 |
| 4,553,042 | 11/1985 | Batterman | 307/263 |
| 4,697,098 | 9/1987 | Cloke | 307/354 |
| 4,749,879 | 7/1988 | Peterson et al. | 307/354 |
| 4,758,891 | 7/1988 | Hitchcock | 358/166 |
| 4,780,623 | 10/1988 | Yagi | 307/351 |
| 4,918,528 | 4/1990 | Oohashi | 358/162 |
| 4,926,442 | 5/1990 | Bukowski et al. | 307/351 |
| 4,979,228 | 12/1990 | Rzeszewski | 382/54 |
| 4,980,755 | 12/1990 | Ozaki | 358/37 |
| 5,151,787 | 9/1992 | Park | 358/162 |
| 5,196,736 | 3/1993 | Doornhein | 307/263 |

FOREIGN PATENT DOCUMENTS

| 0263617 | 4/1988 | European Pat. Off. . |
| 0302500 | 2/1989 | European Pat. Off. . |
| 0478024 | 4/1992 | European Pat. Off. . |
| 4039122 | 6/1991 | Germany . |
| 2144302 | 2/1985 | United Kingdom . |
| 2213022 | 8/1989 | United Kingdom . |
| 2241408 | 8/1991 | United Kingdom . |

OTHER PUBLICATIONS

Pat. Abstracts of Japan, vol. 14, No. 489 (E-994) Oct. 24, 1990 & JP-A-02 202 274 (Matsushita Electric Ind. Co.) Aug. 10, 1990.
Pat. Abstracts of Japan, vol. 16, No. 052 (E-1164) Feb. 10, 1992 & JP-A-03 252 273 (Mitsubishi Electric Corp.) Nov. 11, 1991.
Pat. Abstracts of Japan, vol. 15, No. 319 (E-1100) Aug. 14, 1991 & JP-A-03 117 995 (Mitsubishi Electric Corp.) May 20, 1991.

Primary Examiner—Timothy P. Callahan
Assistant Examiner—My-Trang Nu Ton
Attorney, Agent, or Firm—Ware, Fressola, Van Der Sluys & Adolphson

[57] ABSTRACT

Two edge detectors (12, 13) at the input (10.1) and the output (10.2) of a delay line (10) of the edge detector arrangement (11) generate detection signals of identical shape at the detected signal edges of a signal traveling over the delay line. The delay time of the delay line is selected so that the two detection signals partly overlap in time. A subtraction arrangement (16) generates, from the two detection signals, a difference signal that contains, in the overlap region, a zero crossing that can be detected by a zero crossing detector (17). At the time of this zero crossing, the zero crossing detector generates the switching edge of an edge detection signal that controls, for example, a signal switcher (9).

7 Claims, 4 Drawing Sheets

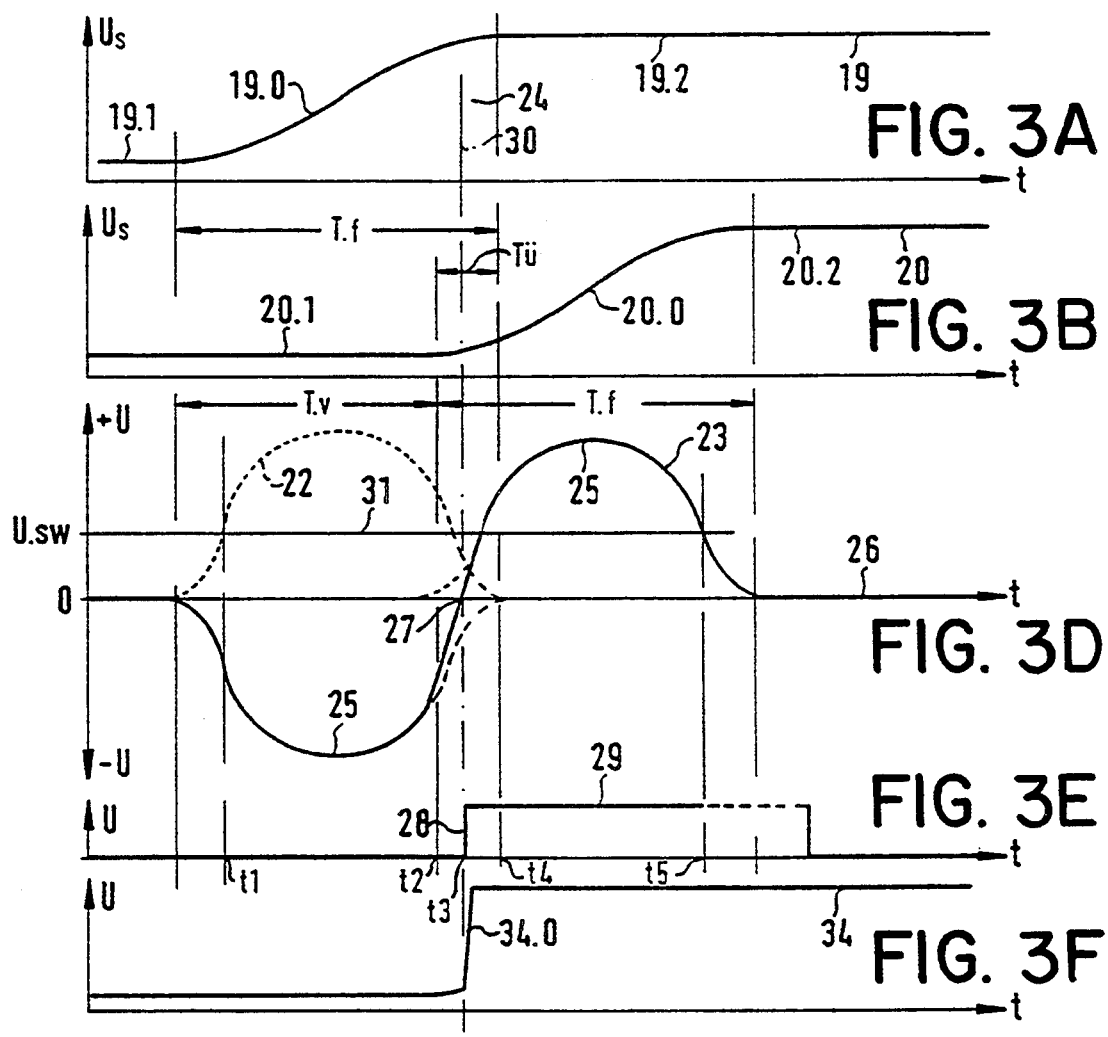
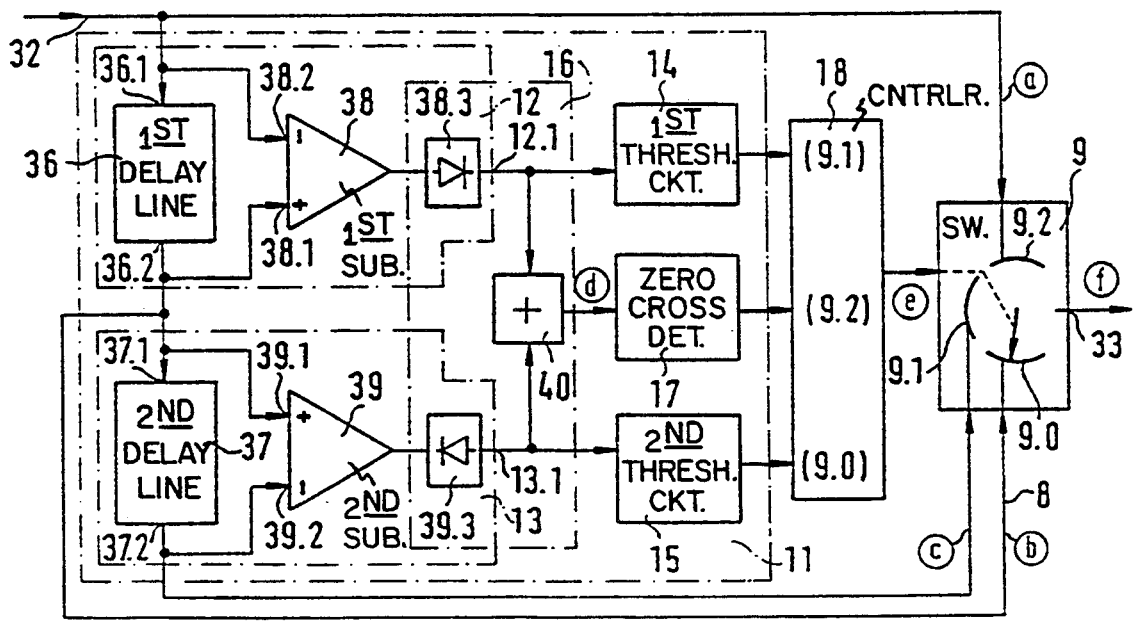

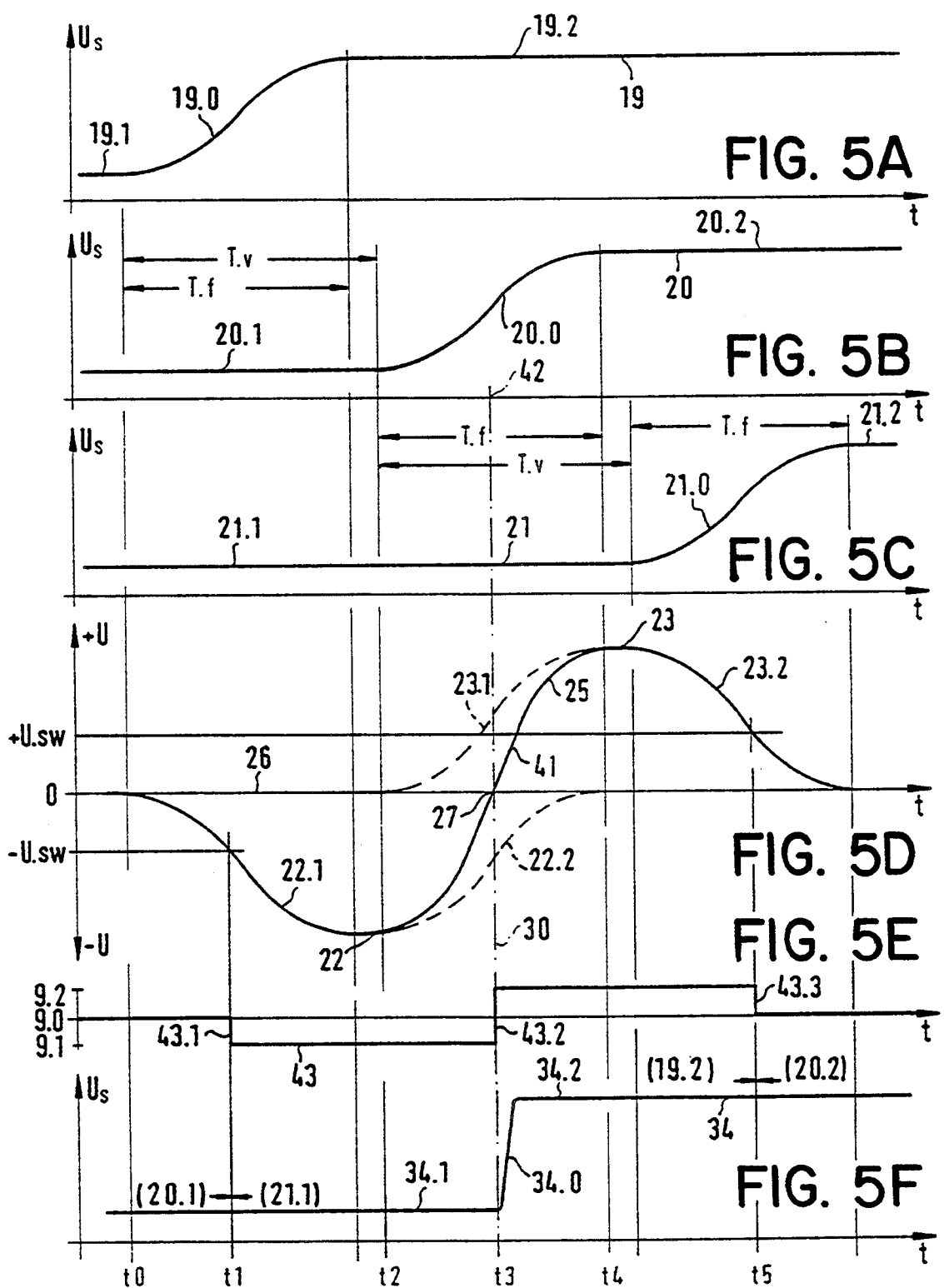

ARRANGEMENT FOR TEMPORAL DETECTION OF A SIGNAL EDGE OF AN ELECTRICAL SIGNAL TRANSMITTED OVER A TRANSMISSION LINE

TECHNICAL FIELD

The invention refers to signal detection and, more particularly, to an edge detection arrangement for temporal detection of a signal edge between two signal states.

BACKGROUND OF THE INVENTION

Signal edges in transmitted signals are often prominent points within the transmitted signal, which especially in measurement technology or in transmission technology lead from one signal state to another signal state.

A detector arrangement for detection of even relatively shallow signal edges of a color difference signal transmitted by amplitude modulation over a transmission line is known from Technical Bulletin TI 891023 of the Phillips company entitled "The TDA 4670 circuit for image signal reprocessing in television receivers." In this edge detector arrangement, a differentiating edge detector, which generates at its output a detector signal that depends on the type of signal edge detected, is connected to each of the two color difference transmission lines of a color television. This detector signal is differentiated again in a downstream pulse shaper of the arrangement, and then conveyed to a switching circuit with a set switching threshold. The switching signals of the edge detector arrangement generated in this manner control an analog switch in the transmission line, at the output side of which is placed a storage capacitor. The analog switch is interrupted for the duration of the switching signal of the edge detector arrangement, so that while the analog switch is in the interrupted state, the storage capacitor determines the level of the output-side transmission signal, and keeps the transmission signal for that period at the level most recently applied before the analog switch opened. After the analog switch closes again—i.e. after the end of the signal edge—the signal on the output-side transmission line changes, with the relatively short charging time of the storage capacitor, to the level of the signal state after the signal edge, so that the slope of the corrected signal edge depends only on the short charging time of the storage capacitor.

However, the shape and amplitude of the differentiation signals generated by the edge detector depend very much on the nature of the detected signal edge. If the signal edge being detected also has a relatively long edge duration, then the point in time at which the generated detection signal reaches the threshold level (which also represents the detection time of the detected signal edge) is temporally very imprecise, as depicted schematically in diagrams (a) to (c) of FIG. 1. FIG. 1(a) schematically depicts the signal edges 1.1, 1.2, and 1.3 of three transmitted electrical signals 2.1, 2.2, and 2.3, each of which rises, over an edge duration T.f, from a level P1.1, P1.2, and P1.3 to a level P2.1, P2.2, and P2.3, respectively. FIG. 1(b) schematically depicts the three associated bell-shaped detection signals 3.1, 3.2, and 3.3 of an edge detector (not described further). Also plotted in FIG. 1(b) is the reference level Ps at which the portion 4.3 of the detector signal 3.3 that exceeds this reference level generates, at the output of a threshold switch of an ordinary detector arrangement, a switching signal 6.3 depicted in FIG. 1(c). Since the three detection signals 3.1, 3.2, and 3.3 themselves have very different amplitudes and edge slopes, they pass through the reference level Ps of the detector arrangement at very different times t1, t2, or t3, although they begin at the same initial time t0. However, these different times define the switching edges 5.1, 5.2, and 5.3 for the detection time of the detected signal flanks. In many cases this kind of correlation between the detection time of the detected signal flanks and the nature of the edges of the detection signals is not tolerable.

DISCLOSURE OF INVENTION

The underlying object of the invention is to indicate an edge detection arrangement of a kind for temporal detection of a signal edge between a first signal state and a second signal state of an electrical signal transmitted on a transmission line for generating a switching edge of a switching signal at the detection time of the signal edge, and which, by means of a switching signal, outputs a detection time of a detected signal edge that is largely independent of the shape of the detected signal edge.

According to the present invention, an edge detection arrangement comprises a first edge detector that is connected to the transmission line for generating a first detection signal, a second edge detector that is connected via a delay line to the transmission line to generate a second detection signal identical in shape to the first detection signal upon detection of the signal edge of the delayed signal, a time delay means selected such that the two detection signals generated by the first and second edge detectors partly overlap in time, a subtraction arrangement arranged after one of the edge detectors to generate a difference signal from the two detection signals with a zero crossing at the detection point of the signal edge of the delayed signal, and a zero crossing detector connected to the output of the subtraction arrangement for generating the zero crossing of the difference signal and for generating a switching edge of the switching signal at the detection time of the signal edge at which the zero crossing is detected.

With the means of the invention, two identically shaped, offset, but still overlapping detection signals are generated, in a simple manner, at the edge of the delayed signal that is to be detected. Subtraction of the two overlapping detection signals in a subtraction arrangement produces a difference signal that contains, in the overlap region of the two individual signals in the center of the difference signal, a zero crossing at the steepest portion of the difference signal. The location of the zero crossing is largely independent of the shape and amplitude of the detector signals of the two edge detectors.

In further accord with the present invention, the first and second edge detectors are circuits which differentiate the signal edges of the signal edges they detect and which, during differentiation, generate the first and second detection signals, respectively. The delay time of the delay line may be slightly less than the maximum edge duration of the transmitted electrical signals.

In still further accord with the present invention, the first and second edge detectors each comprise a delay line and a difference circuit connected at one difference input to the input of the delay line and at the other difference input to the output thereof. The delay line inserted before the second edge detector may be the delay line of the first edge detector.

According still further to the present invention, a signal switcher may be arranged in the transmission line to correct the edge slope of the signal edges of the transmitted electrical signal and wherein the signal contacts of the signal switcher are connected to the inputs and outputs of the delay lines and the inputs of a switch controller arrangement for controlling the signal switcher are connected to the outputs of the edge detectors and of the zero crossing detector and, with the signal switcher in the rest state, the output of the signal switcher is connected to the output of the first delay line and, in the switching state of the signal switcher set after the time at which the signal edge is detected, is connected to the input of the first delay line. When the first and second edge detectors with delay lines are used, the signal switcher has a switch position between the rest position and the switch position after detection of the signal edge of the delay signal that can be set with the detection signal of the first edge detector and in which the output of the signal switcher is connected to the output of the delay line of the second edge detector.

In further accord with the present invention, between each output of the first and second edge detectors and the associated detector outputs of the edge detector arrangement there is arranged a threshold value circuit to generate a detector output signal as soon as the level of the detection signal of the edge detector is greater than a reference level set in the threshold value circuit. Several advantageous embodiments of edge detectors in accordance with the invention are shown below. These embodiments are explained further in the description with reference to examples of the invention. Also indicated in the subsidiary Claims is a particularly advantageous development of the invention that is also explained in more detail in the description below of examples of the invention. This development makes possible a particularly simple correction of the slope of the signal edges of a transmitted signal, especially when long transmission paths or clipping of the transmission bandwidth of the transmitted signal severely flattens the signal edges contained therein.

The invention will be explained in more detail below with reference to advantageous exemplary embodiments. These explanations are designed solely for better comprehension of this invention. However, the invention is not limited to the embodiments—especially of the edge detectors—or the developments of the edge detector arrangement, that are described. In particular, the invention encompasses every type of embodiment of edge detectors and arrangements for generating a difference signal that exhibits the features which achieve the object of the invention, specifically the subtractive superimposition of two identical detector signals to form a difference signal with a defined zero crossing.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 shows, in diagrams (a), (b) and (d) to (f), signals occurring in the block circuit diagram according to FIG. 2 at the points marked by circles with the diagram reference letters of FIG. 3 within;

FIG. 4 shows a block circuit diagram of another embodiment of an edge detector arrangement, with a three-stage signal switcher controlled by it;

FIG. 5 shows, in diagrams (a) to (f), the signals occurring at the points of the block circuit diagram according to FIG. 4 marked with the diagram reference letters;

BEST MODE FOR CARRYING OUT THE INVENTION

Figure 1A:
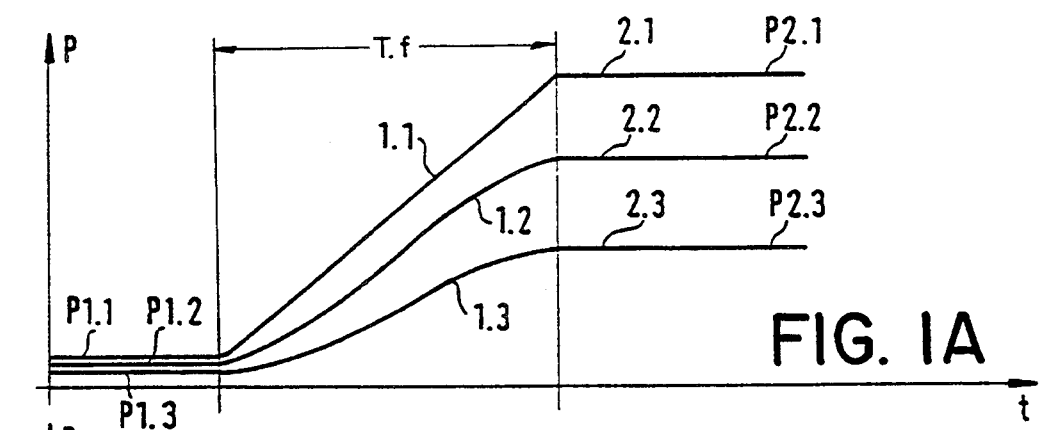
FIG. 1 shows, in a diagram (a), a signal edge of a plurality of transmitted electrical signals; in a diagram (b), the associated detector signals of an ordinary edge detection system, with the reference level drawn in; and in a diagram (c), the switching edges of the detection switching signals generated at the detection times.
Figure 1B:
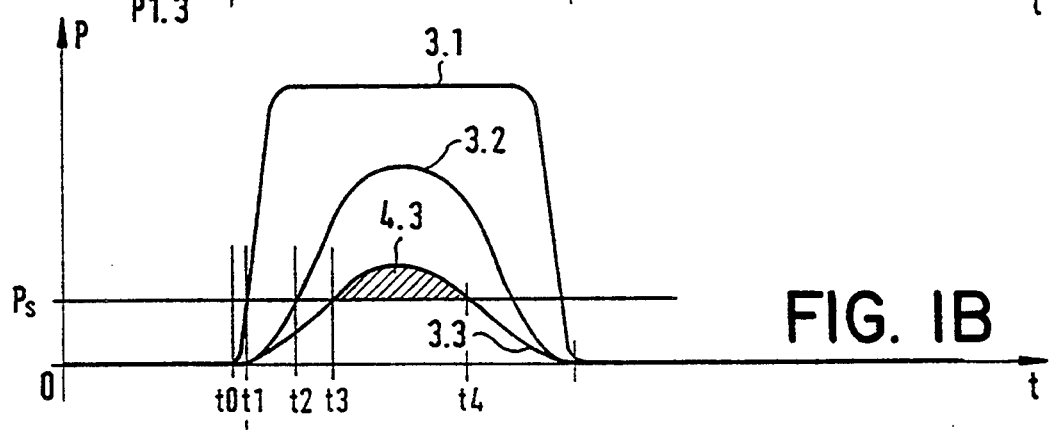
Figure 1C:
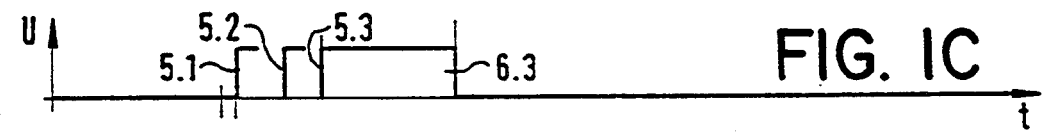
Figure 2:
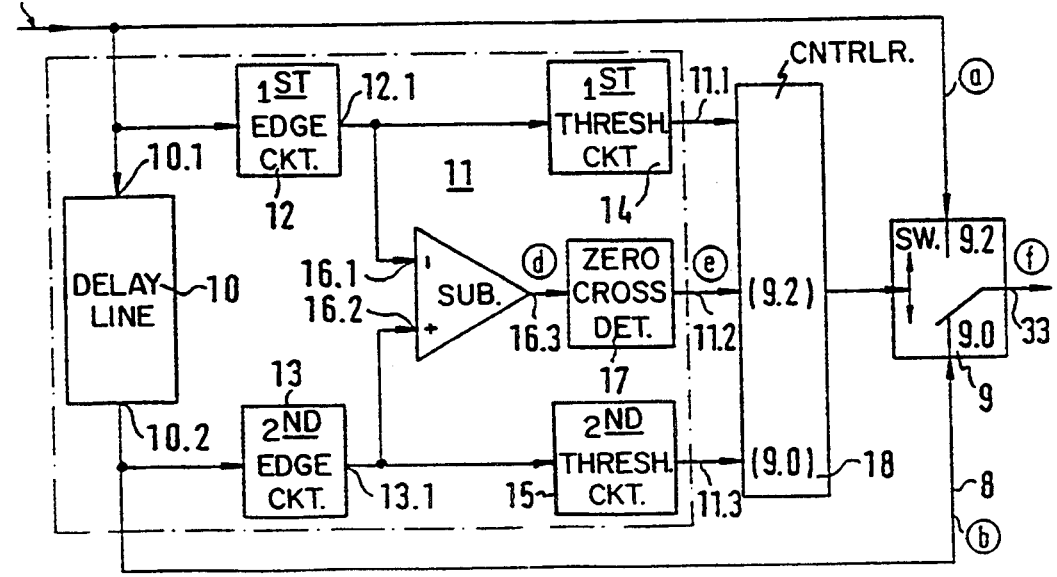
FIG. 2 shows a block circuit diagram of an edge detector arrangement, with a signal switcher controlled by it.

An edge detector arrangement 11 depicted schematically in FIG. 2 in a block circuit diagram contains a delay line 10 that is arranged in a transmission line 8. Also connected to the edge detector arrangement 11 is a signal switcher 9 controlled by it, one of whose selector contacts 9.0 is connected to the output 10.2 of the delay line 10, and the other of whose selector contacts 9.2 is connected to the input 10.1 of the delay line. In the exemplary embodiment depicted, the signal switcher 9 is controlled by the switching signals of a detector arrangement 11 for temporal detection of signal edges of an electrical signal transmitted over the transmission line 8.

The edge detector arrangement 11 contains, in addition to the delay line 10 inserted into the transmission line 8, a first edge detector 12 connected to the input 10.1 of the delay line, and a second edge detector 13 connected to the output 10.2 of the delay line; two threshold value circuits, of which one threshold value circuit 14 is connected to the output 12.1 of the first edge detector 12, and the second threshold value circuit 15 to the output 13.1 of the second edge detector 13; a subtraction arrangement 16, one subtraction input 16.1 of which is connected to the output of the first edge detector 12, and the other subtraction input to the output of the second edge detector 13; and a zero crossing detector 17 connected to the output 16.3 of the subtraction arrangement 16. The outputs of the threshold value circuits 14 and 15 and of the zero crossing detector 17 terminate at detector outputs 11.1 to 11.3 of the edge detector arrangement 11. Connected to these outputs is a switch controller arrangement 18 whose output signals control the signal switcher 9 as a function of the input signals from the edge detector arrangement 11.

The mode of operation of this exemplary embodiment of an edge detector arrangement will be explained in more detail with reference to diagrams (a), (b), and (d) to (f) of FIG. 3. The location of the signals depicted schematically in diagrams (a) to (f) is marked in the block circuit diagram of FIG. 2 by circled diagram letters. Diagram (a) depicts a portion of the undelayed electrical signal 19, with a signal edge 19.0 at which the transmitted signal changes, within an edge time period T.f, from a first signal state 19.1 to a second signal state 19.2. Diagram (b) depicts a portion of the delayed signal 20—generated from the undelayed signal 19 at the output 10.2 of the delay line 10 by delaying the signal by the delay time T.v—with the signal edge 20.0 at which the transmitted delayed signal, in the same way as the undelayed signal, changes from a first signal state 20.1 to a second signal state 20.2. The edge detectors 12 and 13 generate from the detected signal edges 19.0 and 20.0, by differentiation of these edges, detection signals 22 and 23 which correspond to the shape of the edges, of which the detection signal 22 generated by the first edge detector 12 is shown as a dotted line in diagram (d), and the detection signal 23 generated by the second edge detector 13 is depicted as a solid line. The two detection signals 22 and 23 depicted in diagram (d) overlap temporally within a temporal overlap region 24 that is equal to the difference T.ü resulting when the delay time T.v of the delay line 10 is subtracted from the edge duration T.f of the signal edge 19.0, if the delay time is less than the edge duration. The subtraction arrangement 16 forms from the two identically shaped detection signals 22 and 23, by subtraction, a difference signal 25, whose starting and ending regions follow the detection signals 22 and 23 of the edge detectors 12 and 13, and which in the overlap region passes through the zero line 26 of the difference signal with a steep slope, if the delay time T.v of the delay line 10 is less than the shortest edge duration T.fmin, as depicted in diagram (d). This difference signal 26 is scanned by the zero crossing detector 17. When it detects a zero crossing 27 through the zero line 26 by the difference signal 25, it generates a switching edge 28 of a switching signal 29 at the output 11.2 of the edge detection arrangement 11, as depicted in diagram (e).

Because the two detection signals 22 and 23 of the edge detectors 12 and 13 are subtracted, the zero crossing 27 of the difference signal 25 always lies at the center 30 of the overlap region 24 of the two detection signals 22 and 23, regardless of the shape and amplitude of the said detection signals.

In the exemplary embodiment depicted, if the profile of the first detection signal 22 exceeds, at time t1, a reference value U.sw set in the first threshold value circuit 14 as the switching threshold, as depicted in diagram (d) by line 31, an output signal (not depicted further) of the first threshold value circuit 14 at the output 11.1 of the edge detector arrangement 11 switches the switch controller arrangement 18 into a readiness state in which, upon receiving the switching edge 28 of a switching signal 29 generated by the zero crossing detector 17, it sets the signal switcher 18 to a switching state in which the transmission signal 19 is transmitted undelayed from the signal input 32 of the detector arrangement, via the second selector contact 9.2, to the output 33 of the signal switcher 9. The signal edge 34.0 of the output signal 34, depicted in diagram (f), at the output 33 of the signal switcher, which is produced when the signal switcher switches over from the switching state of the conductive selector contact 9.0 to the switching state of the conductive selector contact 9.2, depends only on the switchover characteristics of the signal switcher 9; it is much steeper compared with the transmitted signal edge 20.0 prior to the signal switcher, and subject only to relatively small temporal fluctuations even if the signal edge duration T.f fluctuates very severely.

In an advantageous development of the exemplary embodiment depicted, the edge detector generates, at a time t5 at which the profile of the detection signal at the output 13.1 of the second edge detector 13 again falls below the reference level U.sw of the second threshold value circuit 15, an end signal at the output 11.3, as a result of which the switch controller arrangement 18 returns to its rest state in which it transmits the delayed transmission signal 20 via the selector contact 9.0 of the signal switcher 9, as an output signal 34, to the signal output 33 of the signal switcher.

FIG. 4 depicts a block circuit diagram of another advantageous embodiment of an edge detector arrangement 11 that differs from the edge detector arrangement 11 depicted in FIG. 2 essentially in the design of the edge detectors 12 and 13. The edge detectors of the exemplary embodiment depicted here consist of a delay line 36 and 37 and a subtraction circuit 38 and 39. In the exemplary embodiment depicted, the subtraction circuits are differential amplifiers. In the first edge detector 12 the positive input 38.1 of the subtraction circuit 38 is connected to the output of the associated delay line 36, and in the second edge detector 13, to the input of the associated delay line 37, while the negative input 38.2 of the subtraction circuit 38 of the first edge detector 12 is connected to the input of the associated delay line 36, and the negative input 39.2 of the subtraction circuit 39 of the second edge detector to the output of the associated delay line 37. With this feature, the detection signals 22 and 23 generated by the edge detectors 12 and 13 when the signal edges are detected are generated with opposite polarity, so that the downstream subtraction arrangement 16 can be constructed with an addition circuit 40, which can be much more symmetrical in design than a subtraction circuit. In this case the different polarity of the subtraction circuits of the edge detectors is part of the subtraction arrangement 16. To support this difference in polarity, in the exemplary embodiment illustrated the two edge detectors additionally contain output circuits 38.3 and 39.3 of different polarity.

In the exemplary embodiment illustrated, the signal switcher 9 connected to the edge detection arrangement 11 is an electronic three-position switch which, in the rest state 9.0 transmits the singly delayed signal 19, a portion of which is depicted in diagram (b) of FIG. 5; in the second switch position 9.1 transmits the doubly delayed signal 21 (depicted in diagram (c) of FIG. 5); and in the third switch position 9.3 transmits the undelayed signal (diagram (a) of FIG. 5), in each case to the output 33 of the signal switcher 9.

The mode of operation of the latter exemplary embodiment of an edge detector arrangement in conjunction with a three-position signal switcher 9 will be explained with reference to diagrams (a) to (f) of FIG. 5. Diagrams (a), (b), and (f) are identical to diagrams (a), (b), and (f) of FIG. 3, and contain the same reference numbers as in FIG. 3. Diagram (d) in FIG. 5 contains the curve of the detection signal 22 of the first edge detector 12, which is composed of the curves 22.1 and 22.2, and the curve of the detection signal 23 of the second edge detector 13, which is composed of the curves 23.1 and 23.2. Addition of these two signals in the addition circuit 40 yields a difference signal 25 that is composed of curves 22.1, 41, and 23.2, and, at the zero crossing 27, passes through the zero line 26 of the difference signal with the greatest slope of the difference signal. An unequivocal zero crossing 27 only exists, however, if the two detection signals 22 and 23 of the two edge detectors 12 and 13 partly overlap in time. With this exemplary embodiment, the zero crossing 27 always lies at the center 42 of the edge duration T.f of the signal edge 20.0 of the singly delayed signal 20.

Also drawn in diagram (d) of FIG. 5 are the reference potentials +U.sw and −U.sw of the two threshold value circuits 14 and 15, at which the threshold value circuits generate a switching edge (not depicted further) when the profile of the applied detection signal 22 or 23 passes through the level of these reference values. At the first switching edge 43.1 of the switching signal 43 of the switch controller arrangement 18, which is triggered by the first switching edge of the switching signal (not depicted further) of the first threshold value circuit 14 at time t1, the signal switcher 9 is switched over from switch position 9.0 (rest position) to the first switch position 9.1, in which the doubly delayed signal 21 is transmitted in its first signal state to the output 33 of the signal switcher. At the zero crossing 27 of the difference signal 25 at time t3, detected by the zero crossing detector 17, the switching edge of the zero crossing detector commands the switch controller arrangement 18 into a switching state in which the switching edge 43.2 of the switch control signal 43 generated by it switches the signal switcher 9, at the time t3 of the zero crossing, over to the second switch position 9.2, in which the signal switcher switches its signal output 33, at the switchover velocity of the signal switcher, from the first signal state 21.1 of the doubly delayed transmission signal 21, to the second signal state 19.2 of the undelayed transmission signal 19, as schematically depicted in diagram (f) of FIG. 5. The edge slope of the signal edge 34.0 of the output signal 34 at the signal output 33 of the signal switcher 9 then depends only on the switchover characteristics of the signal switcher, and the detection time, namely the switchover time t3, depends only on the fluctuations in the edge duration T.f. In the exemplary embodiment depicted, the trailing edge of the last crossing of the detection signal 23 of the second edge detector 13 through the reference level U.sw at time t5 resets the signal switcher 9, with the switching edge 43.3, back to its rest position, in which the singly delayed signal 20 is transmitted, via its selector contact 9.0, to the signal output 33 of the signal switcher 9.

Figure 6:
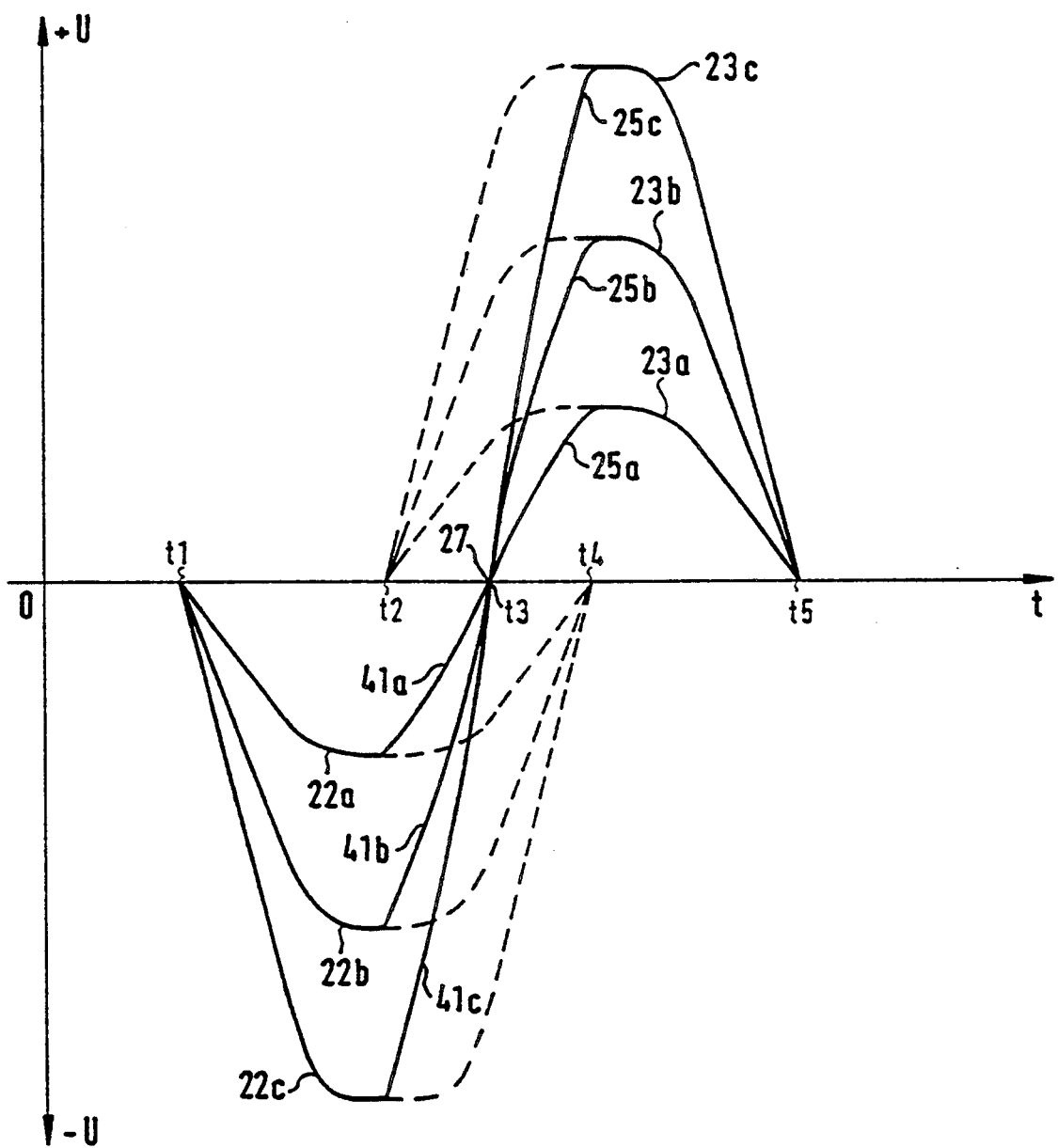
FIG. 6 shows the zero crossing of detection difference signals of various amplitudes.

In the exemplary embodiment just described, addition of the two opposite-polarity detection signals 22 and 23 of the edge detectors 12 and 13 again causes the zero crossing 27 of the difference signal 25 always to be located at the center 30 of the overlap region 24 of the two detection signals 22 and 23, regardless of the shape and amplitude of the said detection signals. This is once again illustrated with reference to FIG. 6, which schematically depicts three detection signals 22a, 22b, and 22c, and 23a, 23b, and 23c, of various amplitudes, of the two edge detectors 12 and 13, as well as the difference signals 25a, 25b, and 25c produced by addition of these detection signals. All three difference signals pass through the zero line 26 of the difference signals at the steepest point of their center curve portion 41a, 41b, 41c, at the zero crossing 27 and at the same time t3. This detection time is thus independent of the amplitude of the detection signals and, because of the symmetrical configuration of the detection signals, is also independent of the shape of the detection signals.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Edge detection arrangement for temporal detection of a signal edge (20.0) between a first signal state (20.1) and a second signal state (20.2) of a delayed signal (20) transmitted after a delay (10) from a first transmission line (32) on a second transmission line (8), and to generate a switching edge (28) of a switching signal (29) at a detection time (13) of the signal edge, comprising:
   a first edge detector (12) connected to the first transmission line (32), for providing a first detection signal (22) in the form of an individual pulse upon detection of a signal edge (19.0) of an undelayed signal (19);
   a second edge detector (13) connected to the second transmission line, for providing a second detection signal (23), identical in shape to the first detection signal, upon detection of the signal edge (20.0) of the delayed signal (20) corresponding to the signal edge of the undelayed signal;
   wherein a delay time (T.v) of the delayed signal is selected such that the delay time (T.v) is slightly less than a shortest edge duration of the transmitted signal and such that the first and second detection signals (22, 23) provided by the edge detectors partly overlap in time;
   a subtraction means (16) connected to the first and second edge detectors (12, 13) for providing a difference signal (25) from the first and second detection signals (22, 23) for providing a composite signal having a zero crossing (27) at said time during which said first and second detection signals overlap at a detection point (t3) of the signal edge (20.0) of the delayed signal; and
   a zero crossing detector (17), connected to an output (16.3) of the subtraction means, for providing the switching edge (28) at the time (t3) at which the zero crossing is detected.

2. Edge detection arrangement according to claim 1, wherein the first and second edge detectors (12, 13) are circuits which differentiate the signal edge (19.0; 20.0) of the undelayed and delayed signals (19; 20), respectively, and which during differentiation generate said first and second detection signals (22; 23) having a slope of the signal edge of the undelayed and delayed signals, respectively.

3. Edge detector arrangement according to claim 1, with a signal switcher (9) arranged in the second transmission line (8) to correct an edge slope of the signal edges (20.0) of the delayed signal (20), wherein
   selector contacts (9.0 to 9.2) of the signal switcher (9) are connected to inputs and outputs (10.1, ... 37.2) of a delay line (10, 36, 37);
   inputs of a switch controller arrangement (18) controlling the signal switcher (9) are connected to the outputs (12.1, 13.1) of the first and second edge detectors (12, 13) and of the zero crossing detector (17); and
   with the signal switcher (9) in a rest state (9.0), the output (33) of the delay line (10, 36), and, in a switching state (9.2) of the signal switcher set after the time (t3) at which the signal edge (20.0) is detected, is connected to the input (10.1; 36.1) of the delay line.

4. Edge detector according to claim 1, wherein between each output (12.1; 13.1) of the edge detectors (12, 13) and associated detector outputs (11.1, 11.3) of the edge detector arrangement (11) there is arranged a threshold value circuit (14; 15) to generate a detector output signal as soon as the level of the detection signal (22; 23) of the edge detector is greater than a reference level (U.sw) set in the threshold value circuit.

5. Edge detection arrangement according to claim 1, wherein the first edge detector (12) comprises a first delayed line (36) and the second edge detector (13) comprises a second delay line (37) and wherein an input and output of the first delay line (36) are connected to inputs of a first subtraction circuit (38) for providing the first detection signal (22) and wherein an input and output of the second delay line (37) are connected to inputs of a second subtraction circuit (39) for providing the second detection signal.

6. Edge detector arrangement according to claim 5 wherein the signal switcher (9) has a switch position (9.1), between a rest position (9.0) and a switch position (9.2) after detection of the signal edge (20.0), that can be set with the first detection signal (22) of the first edge detector (12), and in which the output of the signal switcher is connected to the output (37.2) of the second delay line (37).

7. Edge detector arrangement according to claim 5, wherein an input to the second edge detector (13) is connected to the output of the first delay line (36).

* * * * *

UNITED STATES PATENT AND TRADEMARK OFFICE
CERTIFICATE OF CORRECTION

PATENT NO. : 5,378,946
DATED : January 3, 1995
INVENTOR(S) : G. Reime

It is certified that error appears in the above-indentified patent and that said Letters Patent is hereby corrected as shown below:

Claim 1, line 7 (column 8, line 8), please change "(13)" to --(t3)--; and

Claim 5, line 10 (column 10, line 10), after "signal", please insert --(23)--.

Signed and Sealed this

Twenty-eight Day of March, 1995

Attest:

BRUCE LEHMAN

*Attesting Officer*  *Commissioner of Patents and Trademarks*